United States Patent [19]

Sasaki et al.

[11] 4,311,611

[45] Jan. 19, 1982

[54] PROCESS FOR REGENERATING AN ANTIMONY CONTAINING OXIDE CATALYST

[75] Inventors: Yutaka Sasaki, Yokohama; Kiyoshi Moriya, Kanagawa; Yoshimi Nakamura, Kawasaki, all of Japan

[73] Assignee: Nitto Chemical Industry, Co., Ltd., Tokyo, Japan

[21] Appl. No.: 100,074

[22] Filed: Dec. 4, 1979

[30] Foreign Application Priority Data

Dec. 5, 1978 [JP] Japan .................................. 53-149637

[51] Int. Cl.$^3$ .................. B01J 23/92; B01J 23/96; C07C 120/14; C07C 5/48
[52] U.S. Cl. .................. 252/412; 260/465.3; 568/477; 585/626
[58] Field of Search ...................... 252/412, 439, 456

[56] References Cited

U.S. PATENT DOCUMENTS

| | | | |
|---|---|---|---|
| 1,678,626 | 7/1928 | Jaeger | 252/412 |
| 4,049,575 | 9/1977 | Sasaki et al. | 252/439 |
| 4,165,296 | 8/1979 | Ishii et al. | 252/412 |

*Primary Examiner*—P. E. Konopka
*Attorney, Agent, or Firm*—Sughrue, Mion, Zinn, Macpeak and Seas

[57] ABSTRACT

A process for regenerating a deteriorated antimony containing oxide catalyst comprising as essential components of (i) antimony and (ii) at least one metal element selected from the group consisting of iron, cobalt, nickel, manganese, uranium, cerium, tin and copper wherein the deteriorated antimony containing oxide catalyst is impregnated or sprayed with an aqueous hydrogen peroxide solution and the impregnated catalyst is dried and then calcined at a temperature of about 200° to 1,000° C.

10 Claims, No Drawings

PROCESS FOR REGENERATING AN ANTIMONY CONTAINING OXIDE CATALYST

BACKGROUND OF THE INVENTION

1. Field of the Invention

This invention relates to a process for regenerating an antimony containing oxide catalyst, and more particularly to a process for regenerating an antimony containing oxide catalyst the activity of which has been deteriorated as a result of its use in the oxidation, ammoxidation or oxidative dehydrogenation of hydrocarbons.

2. Description of the Prior Art

It is well known that metal oxide compositions comprising as essential components (i) antimony and (ii) at least one metal element selected from the group consisting of iron, cobalt, nickel, manganese, uranium, cerium, tin and copper is useful as a catalyst for the oxidation, ammoxidation or oxidative dehydrogenation of hydrocarbons, for example, it can be advantageously used in the production of unsaturated aldehydes through the oxidation of olefins, the production of unsaturated nitriles through the ammoxidation of olefins, and in the production of diolefins through the oxidative dehydrogenation of olefins. As catalysts for the production of acrylonitrile by the ammoxidation of propylene, Japanese Patent Publication No. 19111/64 discloses a catalyst comprising an oxide of antimony and iron, cobalt or nickel, U.S. Pat. No. 3,152,170 discloses a catalyst comprising an oxide of antimony and tin, U.S. Pat. No. 3,308,151 discloses a catalyst comprising an oxide of antimony and uranium, and U.S. Pat. Nos. 3,200,081 and 3,340,291 disclose a catalyst comprising an oxide of antimony and manganese or copper. Some later improvements on these catalysts are disclosed in U.S. Pat. No. 3,668,147, Japanese Patent Publication No. 40985/72 and Japanese Patent Publication No. 19764/72 wherein tellurium and at least one element selected from the group consisting of molybdenum, vanadium and tungsten is incorporated in catalysts comprising oxides of antimony and iron, antimony and tin, and antimony and uranium, respectively. Japanese Patent Publication No. 40957/72 describes a catalyst comprising an oxide of antimony and at least one element selected from the group consisting of cerium, titanium, manganese, cobalt, nickel and copper.

In spite of their good catalytic performance, none of the above catalysts are fully satisfactory upon prolonged use and their service life is not always sufficiently long. Even the improved catalysts are subject to a gradual decrease in their activity with extended use and improper reaction conditions often accelerate a reduction in the catalytic activity. It is economically unfeasible to continue using a catalyst which has had its activity reduced below a certain level. In particular, when the catalyst is used industrially on the large scale as in the preparation of acrylonitrile, the influence caused by the deterioration is large and when the deteriorated catalyst is not replaced with a fresh one in the appropriate time, the economical loss is caused remarkably. However, since catalysts of the above specified type are expensive, it is a substantial expenditure for the manufacturer to replace the deteriorated catalyst with a fresh one. It would therefore be economically advantageous if a practical method for regenerating the catalyst were available.

As will be understood from the above explanation, one criterion for determining whether a catalyst is deteriorated or whether a detriorated catalyst has been regenerated by a regenerative method is on an economic level, in contrast to a technical level, which takes into account the activity and selectivity of the catalyst. Based on experience a catalyst is considered "deteriorated" if the yield of the end product is reduced by more than 2 to 3% of the yield obtained using the fresh catalyst, and a catalyst is considered "regenerated" if such yield is restored to the original level or higher.

It is difficult to enumerate the causes of deterioration of a catalyst which occurs during its use. In most cases, many factors combine to cause such deterioration, what is more, locating a particular contributing factor does not directly lead to the development of an effective method of regenerating the catalyst. Therefore, many attempts at providing effective regeneration of the catalyst have turned unsuccessful.

A method of regenerating an antimony-uranium oxide catalyst is described in U.S. patent application Ser. Nos. 83,187 and 103,005 (corresponding to Japanese Patent Application (OPI) No. 8615/72) (The term "OPI" as used herein refers to a "published unexamined Japanese patent application") and British Pat. No. 1,365,096. That method is characterized by heating an antimony-uranium oxide catalyst complex in a fluidized state, in a non-reducing gas at a temperature of from 800° to 1,800° F. and for a time such that the surface area of the catalyst does not fall below a minimum critical level of 5 $m^2/g$. The basic concept behind the method is to heat the catalyst before its performance, which is determined by the surface area of the catalyst, drops to a minimum critical level. In addition, the method is applicable over a wide range of temperatures. Therefore, this method may be considered a satisfactory practical method for regenerating the catalyst. However, antimony containing oxide catalysts wherein antimony is combined with elements other than uranium cannot be regenerated by such a simple procedure. For example, it is described in U.S. patent application Ser. No. 954,675 (corresponding to Japanese Patent Application (OPI) No. 62193/79) that iron-antimony containing oxide catalysts which have a specific composition can only be regenerated under relatively limited conditions and only when the deteriorated catalyst has a specified nature. Accordingly, the method described in Japanese Patent Application (OPI) No. 8615/72 is only suitable for regenerating of an antimony-uranium oxide catalyst.

U.S. Pat. No. 4,049,575 discloses a novel processes for the production and the improvement of catalysts including the catalyst which may be regenerated in accordance with the process of this invention. In accordance with the process disclosed in U.S. Pat. No. 4,049,575 a catalyst composition is prepared by impregnating or spraying onto a mixed metal oxide composition consisting of antimony and a specific metal with a solution containing other active components. The process can be advantageously used in regenerating a deteriorated catalyst as demonstrated by some of the working examples in the patent, but the method is rather complex and costly because it involves preparing a solution of the catalytic component with which the catalyst is impregnated, impregnating the catalyst with a predetermined amount of the solution, drying, and calcining the impregnated catalyst. In particular, the method requires that the impregnating solution contain at least two catalytically active components, but it is not easy to prepare one stable impregnating solution which does not produce a precipitate, for instance. As a result, it is sometimes necessary to use rather expensive reagents as starting materials of active components. The method also introduces new catalytic components to the catalyst, thus yielding a regenerated catalyst having a different composition and different physical properties than the original catalyst or having a different reaction rate and different optimum reaction conditions. Therefore, it is often difficult to use the catalyst regenerated in this way in combination with the fresh (unregenerated) catalyst without some disadvantage.

Further, Japanese Patent Application (OPI) No. 81191/79 (corresponding to U.S. patent application Ser. No. 959,810, filed Nov. 18, 1978) provides a process for regenerating an antimony containing oxide catalyst, which comprises impregnating or spraying onto the deteriorated antimony containing oxide catalyst an aqueous solution of nitric acid and/or a nitrate and then drying the impregnated metal oxide catalyst followed by calcining the impregnated catalyst at a temperature ranging from 400° to 1,000° C. The method disclosed in Japanese Patent Application (OPI) No. 81191/79 can be conducted with a wide range of catalysts to be regenerated and is a comparatively simple process in the point of the regenerating operations and conditions. However, because nitric acid and/or the nitrate is very corrosive, the materials used for the regenerating apparatus are extremely restricted and as the large amounts of a nitric acid and a nitrogen oxide are present in the waste gas, the waste gas cannot be vented to the outside, the process has the disadvantage that the apparatus for treating the waste gas must be equipped with pollution control devices to avoid a pollution problem. Therefore, while the method is comparatively simple to conduct, the method has economical problems associated with industrial use. On the other hand, in order to overcome the above problems with respect to the regeneration of the catalyst, this invention was achieved.

SUMMARY OF THE INVENTION

It is therefore an object of this invention to provide a process for regenerating a deteriorated antimony containing oxide catalyst which (i) can be carried out for a wide range of regenerating conditions, (ii) is simple to operate and (iii) has few environmental problems associated with practical industrial use.

This invention achieves this objective by impregnating or spraying onto the deteriorated antimony containing oxide catalyst an aqueous hydrogen peroxide solution followed by calcining the impregnated catalyst at a temperature ranging from about 200° to 1,000° C. In summary, this invention provides a process for regenerating an antimony containing oxide catalyst comprising as essential components of (i) antimony and (ii) at least one metal element selected from the group consisting of iron, cobalt, nickel, manganese, uranium, cerium, tin and copper and which has had its activity deteriorated, wherein the deteriorated antimony containing oxide catalyst is impregnated or sprayed with an aqueous hydrogen peroxide solution, dried, and calcined at a temperature in the range from 200° to 1,000° C.

DETAILED DESCRIPTION OF THE INVENTION

The catalyst regenerated by the process of this invention is an antimony containing oxide catalyst which has had its activity (expressed in the yield of end product) gradually reduced in the course of the oxidation, the ammoxidation or the oxidative dehydrogenation of hydrocarbons or impregnated due to improper operating conditions in such reactions (e.g., in correct feed gas composition or reaction temperature). Of course, the process of this invention is equally useful in regenerating catalysts deteriorated in other reactions, however, these reactions are noted because they are reactions in which the antimony oxide catalysts are frequently employed.

Such antimony containing oxide catalysts comprise as essential components (i) antimony and (ii) at least one metal element selected from the group consisting of iron, cobalt, nickel, manganese, uranium, cerium, tin and copper; it may optionally also contain one or more elements selected from the group consisting of magnesium, calcium, strontium, barium, lanthanum, titanium, zirconium, vanadium, niobium, tantalum, chromium, molybdenum, tungsten, rhenium, ruthenium, osmium, rhodium, iridium, palladium, platinium, silver, zinc, cadmium, boron, aluminum, gallium, indium, thallium, silicon, germanium, lead, phosphorus, arsenic, bismuth, sulfur, selenium and tellurium.

The composition of the antimony containing oxide catalyst is not particularly limited, but a preferred composition is in the range represented by the following empirical formula:

$$Me_aSb_bX_cR_dQ_eO_f$$

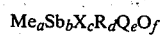

wherein Me is at least one element selected from the group consisting of Fe, Co, Ni, Mn, U, Ce, Sn and Cu; X is at least one element selected from the group consisting of V, Mo, W, Nb and Ta; R is at least one element selected from the group consisting of B, P, Bi and Te; Q is at least one element selected from the group consisting of Mg, Ca, Sr, Ba, La, Ti, Zr, Cr, Re, Ru, Os, Rh, Ir, Pd, Pt, Ag, Zn, Cd, Al, Ga, In, Tl, Si, Ge, Pb, As, S and Se; the subscripts a, b, c, d, e and f represent atomic ratios, and where a is 10, b is 5 to 60, c is 0 to 30, preferably 0 to 15, d is 0 to 10, preferably 0 to 5, e is 0 to 20, preferably 0 to 10, and f is the number of oxygen atoms that combine with these components to form an oxide.

Such catalyst compositions may or may not be carried on a carrier. Suitable carriers include silica, alumina, titania, zirconia, silica alumina, etc.

The concentration of the aqueous hydrogen peroxide solution with which the deteriorated catalyst is impregnated or sprayed according to this invention is not particularly limited. A convenient commercially available hydrogen peroxide has a concentration of about 35 to 60 wt% and can be diluted.

Preferably the aqueous solution has a concentration of about 0.5 to 35 wt%. When the concentration of the hydrogen peroxide is about 0.5 wt% or less, the regenerating effect is somewhat reduced and when the concentration of the hydrogen peroxide exceeds about 35 wt%, safety problems must be considered. Therefore, both extremes should be avoided. Generally changes in the amount of the hydrogen peroxide impregnated and sprayed onto the deteriorated antimony containing oxide catalyst does not alter the regenerating effect. However, a preferred amount of the aqueous hydrogen peroxide solution used varies from about 0.05 to 60 wt% of the catalyst weight. Unlike the method disclosed in U.S. Pat. No. 4,049,575, the method of this invention does not rely upon catalytically active components and, as a result, the performance of the regenerated catalyst is not impaired even if the amount of hydrogen peroxide is excessive. The only consideration that is necessary to determine the upper limit of the amount of the hydrogen peroxide is the convenience of the practical operation, thus allowing a wide range within which to vary the amount of hydrogen peroxide.

Slight amounts of other components may be contained in the aqueous hydrogen peroxide solution, if desired, to adjust the reaction rate or control by-products. For example, vanadic acid, molybdic acid and tungstic acid and the salts thereof can be present. These compounds probably form the peroxy-compound in the presence of hydrogen peroxide. The resulting solution is a stable solution not containing a precipitate. Further, the aqueous hydrogen peroxide solution containing oxidation products prepared by oxidizing a metallic tellurium, a tetravalent telluride or a tellurium oxide hydrate with hydrogen peroxide can also be used. In a tellurium containing hydrogen peroxide solution telluric acid is at least partly formed, a stable solution can be prepared. Compounds of elements other than the above are sometimes added to the solution to supply the metals exhausted from the regenerated catalyst, as long as the compounds do not accelerate the decomposition of hydrogen peroxide and the compounds do not adversely affect the regeneration reaction. Representative examples of elements other than tellurium are P, B, Bi, Mg, Ca, Ti, Zr, Fe, Co, Ni, Cu, etc. As a cautionary note a compound incorporated into the hydrogen peroxide may leave an elemental residue in the regenerated catalyst (this is particularly true for a metal compound) and may have an adverse effect on the catalyst performance if the amount of the elemental residue in the catalyst is excessive. The extent to which the residual element affects the catalytic activity varies from one element to the next, but broadly stated, the maximum atomic ratio of the element to the antimony should be 1/10 or less.

Hydrogen peroxide is comparatively apt to decompose and there are instances where the decomposition of hydrogen peroxide is accelerated in the presence of a metal or a metal oxide. However, even if the antimony containing oxide catalyst regenerated by the process of this invention contacts with hydrogen peroxide, the reaction is not accelerated such that it occurs at an uncontrollable rate and the meaningless decomposition of hydrogen peroxide results. Therefore, the objects of this invention can be sufficiently achieved.

Various methods may be employed for impregnating or spraying the deteriorated catalyst with the aqueous hydrogen peroxide solution according to this invention. In one example, an aqueous hydrogen peroxide solution is prepared in an amount more than enough to immerse the deteriorated catalyst, the catalyst is then held in the solution for a period of time sufficient for the pores in the catalyst to be adequately impregnated with the solution. In this case, it is possible to increase the permeation velocity of the impregnating solution to the pores in the catalyst by evacuating the gas from the pores. A period of about 10 minutes to 2 hours generally serves this purpose. Then, the catalyst is filtered from the aqueous hydrogen peroxide solution and separated by centrifugation to prepare a regenerated catalyst. In this step, the pores in the catalyst are filled with hydrogen peroxide. Alternatively, a metered amount of the hydrogen peroxide corresponding to the pore volume in the catalyst may be adequately mixed with the catalyst. This method is particularly suitable for regenerating a fluidized catalyst. Another suitable technique is to spray the hydrogen peroxide onto the catalyst which is placed in, for example, a rotary drum. No matter what means is used, the most important consideration is that the aqueous hydrogen peroxide solution uniformly reaches every part of the catalyst.

The significance of the hydrogen peroxide in the process of this invention is not yet fully understood, but based on the fact that a part of the antimony containing oxide catalyst is regenerated by calcining at high temperatures under oxygen atmosphere and the antimony containing oxide catalyst in the wide range is regenerated by treating with the nitric acid having strong oxidation action followed by drying and calcining, it is believed that the oxidizing effect of the hydrogen peroxide used in this invention exhibits an important function. Further, it is believed that the hydrogen peroxide helps to reoxidize the active site of the deteriorated catalyst which is irreversibly reduced, i.e., regeneration of $Sb^{3+}$ formed by the deterioration to $Sb^{5+}$.

According to this invention, the catalyst thus impregnated or sprayed with the aqueous hydrogen peroxide solution is dried and then calcined at a temperature of about 200° to 1,000° C., preferably about 300° to 900° C. A temperature higher than 1,000° C. reduces the activity and strength of the catalyst contrary to the intended purpose. The preferred calcination temperature in the regeneration of the catalyst varies according to the catalyst but is in the vicinity of or lower than a temperature 20° C. above the final or highest calcination temperature used in manufacturing the catalyst. The calcination time is about 10 minutes to about 20 hours, preferably about 0.5 to 10 hours.

The catalyst impregnated or sprayed with the aqueous hydrogen peroxide solution can be calcined at the final or highest calcination temperature after drying. However, when the final or highest calcination temperature is higher than 600° C., it is preferred to temporarily calcine the dried catalyst at a relatively low temperature to remove the volatile components such as water and then to calcine the resulting catalyst at the final or highest calcination temperature. If the dried catalyst having an undesirable amount of the volatile component such as water is calcined at a temperature higher than 600° C., sintering of the catalyst may be accelerated and the activity of the catalyst reduced.

A non-reducing atmosphere is preferably used for calcining the catalyst. An air and an air stream are convenient for practical purposes, but nitrogen, helium, carbon dioxide gas, etc., may be used.

There is no particular limitation on the type of the apparatus for drying and calcining the deteriorated catalyst according to the process of this invention; a stationary furnace, a tunnel furnace, a rotary kiln, a fluidized bed calciner and other furnaces conventionally used for manufacturing of catalysts can be used for this purpose. The process of this invention can be applied to both fluidized type and fixed bed type antimony containing oxide catalysts.

The catalyst thus regenerated by the process of this invention has its performance (selectivity, activity and optimum reaction conditions) restored to a level substantially equal to that of the fresh catalyst. In addition, the physical properties of the regenerated catalyst are little affected. Accordingly, the regenerated catalyst can be used independently of or in combination with fresh catalyst. As a further advantage, the process of this invention can be operated in a very simple manner and is suitable for regenerating many types of antimony containing oxide catalysts, thus offering great advantages in industrial applications.

The operation and effect of this invention will now be described in greater detail by reference to the following Examples and Comparative Examples which are not intended to limit the scope of this invention.

In this invention, the yield of end product is defined as follows:

Yield of end product (%) =
$\frac{\text{carbon weight of end product}}{\text{carbon weight of feed hydrocarbon}} \times 100$ The following conditions were used to test the activity of the catalysts in the Examples and Comparative Examples below.

Test Condition I

A fixed bed reactor having an inner diameter of 16 mm and a length of 500 mm was packed with 25 ml of a catalyst and heated in a molten salt bath comprising a mixture of equal weights of sodium nitrite and potassium nitrate. The reactor was fed with a gas of the following composition at a rate of 7.5 l (NTP) per hour. The reaction pressure was atmospheric.
air/1-butene=5 (molar ratio)
water/1-butene=1.5 (molar ratio)

Test Condition II

A fixed bed reactor having an inner diameter of 16 mm and a length of 500 mm was packed with 25 ml of a catalyst and heated in a molten salt bath comprising a mixture of equal weights of sodium nitrite and potassium nitrate. The reactor was fed with a gas of the following composition at 12 l (NTP) per hour. The reaction pressure was atmospheric.
air/isobutene=16.7 (molar ratio)
NH$_3$/isobutene=1.3 (molar ratio)
water/isobutene=4.0 (molar ratio)

Test Condition III

A fixed bed reactor having an inner diameter of 16 mm and a length of 500 mm was packed with 25 ml of a catalyst and heated in a molten salt bath comprising a mixture of equal weights of sodium nitrite and potassium nitrate. The reactor was fed with a gas of the following composition at 10 l (NTP) per hour. The reaction pressure was atmospheric.
air/propylene=10.5 (molar ratio)
NH$_3$/propylene=1.05 (molar ratio)

Test condition IV

A fluidized bed reactor having an inner diameter of 2 inches at the reaction zone and a height of 2 m was packed with catalyst. The reactor was fed with a starting gas (propylene, NH$_3$ and water) of the following composition at an apparent linear velocity of 15 cm/sec.
air/propylene=10.5 (molar ratio)
NH$_3$/propylene=1.05 (molar ratio)
The contact time is defined as follows:

$$\text{Contact Time (sec)} = \frac{\text{Volume of the packed catalyst (based on apparent bulk density) (l)}}{\text{Velocity of feed gas under the temperature and pressure as reaction conditions (l/sec)}}$$

The reaction pressure was atmospheric.

EXAMPLE 1

A catalyst having the empirical formula of Fe$_{10}$Sb$_{25}$W$_{0.25}$Te$_{1.0}$O$_{67.8}$(SiO$_2$)$_{30}$ was prepared as follows.

60.9 g of metallic antimony powder was added portion-wise to 225 ml of heated nitric acid (specific gravity 1.38). After the termination of the generation of a brown gas following the completion of the addition of the antimony, the mixture was allowed to stand at room temperature for 16 hours. Thereafter, excess nitric acid was removed and the precipitate was washed with 100 ml portions of water 3 times. Product (I)

11.2 g of electrolytic iron powder was added portion-wise to a solution consisting of 81 ml of nitric acid (specific gravity 1.38) and 100 ml of water and dissolved therein completely. Product (II)

1.3 g of ammonium paratungstate was dissolved in 50 ml of water. 4.6 g of telluric acid was added to the solution of ammonium paratungstate prepared above and dissolved. Product (III)

As the carrier component, 180 g of silica sol (20% by weight of SiO$_2$) was weighed out. Product (IV)

(II) and (IV) were mixed together and (III) was added thereto to give a liquid mixture which was then mixed with (I), to which aqueous ammonia (28%) was gradually added with stirring to adjust the pH to 2. This mixture was then heated with stirring to concentrate to dryness.

The dried product was crushed and calcined at 200° C. for 2 hours and then at 400° C. for 2 hours, after which water was added, mixed together and the mixture was molded to tablets of 2 mm×2 mm$\phi$. They were dried at 130° C. for 16 hours and then calcined at 900° C. for 2 hours.

When the activity of this catalyst was tested according to the Test Condition I described above and using a reaction temperature of 370° C., the percent conversion of butene-1 was 92% and the yield of butadiene was 83%, but with the decrease of supplied air during the reaction, the yield of butadiene was decreased. Although the molar ratio of supplied gases was adjusted to the Test Condition I, the percent conversion of butene-1 became 87% and the yield of butadiene became 74%.

This catalyst was withdrawn from the reactor and treated to regenerate it by the process in accordance with the present invention. More particularly, the deteriorated catalyst was immersed in a 5% aqueous hydrogen peroxide solution to evacuate a gas present in the pores of the catalyst and, after the termination of the generation of air bubbles, excess aqueous hydrogen peroxide solution was centrifugally separated. Thereafter, this was dried at 120° C. for 16 hours and calcined at 300° C. for 3 hours.

When this regenerated catalyst was used in a reaction using the same test condition as above, the percent conversion of butene-1 was 95% and the yield of butadiene was 85%.

EXAMPLE 2

A catalyst having the empirical formula of $U_{10}Fe_2Sb_{40}O_{209.6}(SiO_2)_{50}$ was prepared as follows.

195 g of metallic antimony powder was weighed out. 720 ml of nitric acid having a specific gravity of 1.38 was heated to about 80° C. and the above antimony powder was added portion-wise to the acid. After confirming that the antimony was completely oxidized, excess nitric acid was removed. Thereafter, the nitric acid oxidized antimony oxide product was then washed with 200 ml portions of water three times and ground in a ball mill for 3 hours. Product (I)

200 g of uranyl nitrate was dissolved in 500 ml of water. Product (II)

40 ml of nitric acid of a specific gravity of 1.38 was mixed with 50 ml of water and heated to about 80° C., after which 4.5 g of electrolytic iron powder was added portion-wise thereto and dissolved completely. Product (III)

600 g of silica sol (20% by weight of $SiO_2$). Product (IV)

The above four components (I), (II), (III) and (IV) were mixed together and with sufficient stirring heated at 100° C. for 5 hours.

The slurry thus prepared was spray dried in a conventional manner. The obtained fine granular particles were heated at 200° C. for 4 hours and then calcined at 400° C. for 4 hours, after which water was added, mixed together and the mixture was molded into tablets of 2 mm×2 mm$\phi$. They were dried at 130° C. for 16 hours and then calcined at 800° C. for 4 hours.

The activity of this catalyst was tested at 430° C. for 8 hours according to the Test Condition II described above. At the start of the reaction, the percent conversion of isobutylene was 96% and the yield of methacrylonitrile was 58%, but during the reaction the percent conversion and the yield both decreased resulting in the precent conversion of isobutylene of 86% and the yield of methacrylonitrile of 47% after the 8-hour reaction.

This catalyst was withdrawn from the reactor and treated to regenerate it by the process in accordance with the present invention. More particularly, this deteriorated catalyst was immersed in a 30% aqueous hydrogen peroxide solution to evacuate. After the termination of air bubble generation the excess aqueous hydrogen peroxide solution was centrifugally separated. Thereafter, the catalyst was dried at 120° C. for 16 hours and then calcined at 600° C. for 4 hours.

When this regenerated catalyst was used in a reaction under the same test condition as above, the percent conversion of isobutylene was 95% and the yield of methacrylonitrile was 58%.

EXAMPLE 3

A fluidized catalyst having the empirical formula of $Sn_{10}Sb_{60}O_{140}(SiO_2)_{100}$ was prepared as follows.

Ice cubes were floated on 10 l of water, into which 4.79 kg antimony pentachloride was poured portion-wise. Thereafter, 28% ammonia water was gradually added to adjust the pH to 8. The formed precipitate was filtered off and washed with 3 l portions of water three times. Product (I)

1 l of nitric acid having a specific gravity of 1.38 was heated to about 80° C. and 0.317 kg of metallic tin powder having a particle size of 100 microns or less was added portion-wise thereto and completely oxidized. Product (II)

8.02 kg of silica sol (20% by weight of $SiO_2$). Product (III)

The above three components (I), (II) and (III) were mixed together and with sufficient stirring a 28% ammonia water was added thereto to adjust the pH to 2.5. The thus obtained slurry was heated with sufficient stirring at 100° C. for 4 hours.

The slurry was then spray dried in a conventional manner. The thus obtained fine granular particles were gradually heated in an external heating type rotary kiln finally to 800° C. to effect the calcination. This operation took 6 hours.

The activity of this catalyst was tested at 460° C. with a contact time of 6 seconds according to Test Condition IV described above. At the start of the reaction, the percent conversion of propylene was 95% and the yield of acrylonitrile was 62%, but during the reaction the amount of ammonia supplied was dropped to ⅓ of the predetermined value due to the breakdown of the ammonia flow-meter, thus causing an increase in carbon dioxide generation. The reaction was stopped for adjusting the ammonia flow-meter and it was carried out again under the predetermined conditions, and it was found that the percent conversion of propylene and the yield of acrylonitrile had been reduced to 74% and 34%, respectively.

Then, this catalyst was withdrawn from the reactor and treated to regenerate it by the process in accordance with the present invention. More particularly, a 10% aqueous hydrogen peroxide solution in an amount corresponding to the pore volume of the catalyst (0.45 ml/g) was mixed with the catalyst. After the aqueous hydrogen peroxide solution was thoroughly diffused throughout the catalyst, the catalyst was dried at 120° C. for 16 hours and then calcined at 600° C. for 4 hours.

When this regenerated catalyst was used in a reaction under the same test condition as above, the percent conversion of propylene was 97% and the yield of acrylonitrile was 63%.

EXAMPLE 4 AND COMPARATIVE EXAMPLE 1

A catalyst having the empirical formula of $Fe_{10}Sb_{25}W_{0.5}Mo_{1.2}Te_3Co_4B_1O_{81.6}(SiO_2)_{60}$ was prepared as follows.

5.84 kg of antimony trioxide. Product (I)

6.4 l of nitric acid (specific gravity 1.38) and 4 l of water were mixed and warmed. 0.894 kg of electrolytic iron powder was added portion-wise thereto and dissolved. 1.864 kg of cobalt nitrate were added thereto. Product (II)

210 g of ammonium paratungstate and 340 g of ammonium paramolybdate were dissolved in 18.4 l of water. Further, 1.104 kg of telluric acid was added thereto and dissolved. Product (III)

19.32 kg of silica sol (30% by weight of $SiO_2$) and 98 g of boric acid were dissolved therein. Product (IV)

To (IV) were added (III), (II) and (I) in this order and with enough stirring a 15% ammonia water was added gradually to adjust the pH to 2. The mixture was heated with sufficient stirring at 100° C. for 8 hours. The slurry was spray dried in a conventional manner. The thus obtained fine granular particles were calcined at 250° C. for 8 hours, then at 400° C. for 16 hours and finally at 700° C. for 4 hours.

This catalyst was packed in a fluidized bed reactor having an inner diameter of 6 inches, and a gas having the following composition was introduced at an apparent gas linear velocity of 16 cm/sec.

Air/propylene = 10.5 (molar ratio)
Ammonia/propylene = 1.05 (molar ratio)

The reaction temperature was 440° C., the apparent contact time was 4.5 seconds and the reaction pressure was 0.5 kg/cm$^2$G.

When the reaction was continued for 800 hours under the above conditions, the yield of acrylonitrile reduced. The catalyst used in this example was tested for its activity before and after the deterioration according to Test Condition IV described above, and it was found that the percent conversion of propylene was 97.5% initially and reduced to 96.2% and the yield of acrylonitrile was 83.3% initially and reduced to 74.1%.

This deteriorated catalyst was withdrawn from the reactor and divided into 1.3 kg portions, and each was treated to regenerate it by the process in accordance with the present invention. More particularly, each impregnation was effected by preparing an aqueous hydrogen peroxide solution in an amount corresponding to the pore volume (which was 0.34 ml/g in this example) and mixing it with the deteriorated catalyst to allow the solution to thoroughly diffuse throughout the pores.

The aqueous hydrogen peroxide solution used for the impregnations were as follows.

Example 4-a:
  a 10% aqueous hydrogen peroxide solution;
4-b:
  a solution obtained by adding tellurium dioxide powder to a 35% aqueous hydrogen peroxide solution, heating to about 90° C. to oxidize and dissolve and diluting with water to the predetermined liquid volume;
4-c:
  a solution of ammonium paramolybdate in a 5% aqueous hydrogen peroxide solution.

For comparison, a catalyst treated by merely calcining the deteriorated catalyst in air showed a poor recovery of activity and was designated as the catalyst of Comparative Example 1.

The respective conditions for regeneration of the catalyst and those for regeneration of the catalyst of Comparative Example 1 together with the results of the test of their activities are shown in Table 1.

EXAMPLE 5

A catalyst having the empirical formula of $Fe_{10}Sb_{6.0}Mo_2Te_5La_{0.5}Ce_1O_{153.7}(SiO_2)_{30}$ was prepared as follows.

7.0 g of electrolytic iron powder and 8.0 g of metallic tellurium were successively added portion-wise to a solution consisting of 120 ml of nitric acid (specific gravity 1.38) and 100 ml of water and completely dissolved therein. To this solution were added 2.7 g of lanthanum nitrate and 6.9 g of ammonium cerium nitrate. Product (I)

4.4 g of ammonium paramolybdate was dissolved in 113.0 g of silica sol (20% by weight of $SiO_2$). Product (II)

(I) and (II) were mixed together and 109.7 g of antimony trioxide powder was added thereto. To the formed slurry was added a 15% ammonia water to adjust the pH to 3, after which the slurry was heated and refluxed at 100° C. with sufficient stirring and then concentrated to dryness. The dried concentrate was calcined at 200° C. for 2 hours and then at 400° C. for 2 hours, added with water and mixed together. The mixture was then molded into cylinders of 2 mm×2 mm$\phi$, dried, and calcined at 660° C. for 4 hours.

This catalyst was used in a reaction at 430° C. according to the Test Condition III described above. At the start of the reaction, the percent conversion of propylene was 100% and the yield of acrylonitrile was 84%, but when the molar ratio of air to propylene supplied was reduced to 8.5, the generation of carbon dioxide increased gradually. Although the reaction was carried out by changing the reaction conditions from the original, the percent conversion of propylene and the yield of acrylonitrile were reduced to 96% and 79%, respectively.

Then, the catalyst was withdrawn from the reactor and treated to regenerate it by the process in accordance with the present invention. More particularly, this deteriorated catalyst was immersed in a 15% aqueous hydrogen peroxide solution to evacuate and, after the termination of air bubble generation, excess aqueous hydrogen peroxide solution was centrifugally separated. Thereafter, this was dried at 120° C. for 16 hours, and then calcined at 500° C. for 4 hours.

TABLE 1

| | Conditions for Regeneration | | | | Results of Activity Test | | |
|---|---|---|---|---|---|---|---|
| | | | Calcination | | Reaction | % Conversion of | Yield of Acrylonitrile |
| | Impregnation Solution | Atomic Ratio | Temp. (°C.) | Time (hr) | Temp. (°C.) | Propylene | (%) |
| Example 4 Before deterioration | | | | | 430 | 97.5 | 83.3 |
| After deterioration | | | | | 430 | 96.6 | 80.7 |
| 4-a | 10% aq. $H_2O_2$ | | 650 | 4 | 430 | 97.8 | 83.5 |
| 4-b | 35% aq. $H_2O_2$ plus tellurium dioxide | Te/Sb = 1.5/100 | 650 | 4 | 430 | 97.2 | 83.6 |
| 4-c | 5% aq. $H_2O_2$ plus ammonium paramolybdate | Mo/Sb = 0.5/100 | 650 | 4 | 430 | 98.1 | 83.0 |
| Comparative Example 1 | | | 650 | 4 | 430 | 97.0 | 81.3 |

When this regenerated catalyst was used in a reaction under the same conditions as above, the percent conversion of propylene was 99% and the yield of acrylonitrile was 83%.

EXAMPLE 6

A catalyst having the empirical formula of $Fe_{10}Sb_{25}W_1Mo_{25}Te_2Mn_2Al_1O_{78.25}(SiO_2)_{60}$ was prepared by procedures similar to those of Example 5, except that the starting materials for W, Mn and Al were 7.9 g of ammonium paratungstate, 17.3 g of manganese nitrate and 11.3 g of aluminum nitrate, respectively. The final calcinating condition for the catalyst was 750° C. for 3 hours.

This catalyst was used in a reaction at 430° C. under the Test Condition III described above. The percent conversion of propylene was 98% and the yield of acrylonitrile was 83%.

After the reaction was carried out for 5 hours using propylene 10% of which was substituted with isobutylene, the feeding of isobutylene was stopped and the reaction was continued under the original reaction conditions. It was found that the percent conversion of propylene and the yield of acrylonitrile had been reduced to 95% and 79%, respectively.

Then, the catalyst was withdrawn from the reactor and treated to regenerate it by the process in accordance with the present invention. More particularly, this deteriorated catalyst was sprayed with a 35% aqueous hydrogen peroxide solution, dried at 120° C. for 16 hours, and then calcined at 700° C. for 4 hours.

This regenerated catalyst was used in a reaction under Test Condition III to obtain a percent conversion of propylene of 99% and a yield of acrylonitrile of 85%.

EXAMPLE 7

A catalyst having the empirical formula of $Fe_{10}Sb_{20}Mo_{0.5}W_{0.2}Te_{1.5}Cu_1Ni_3O_{64.1}(SiO_2)_{30}$ was prepared by procedures similar to those of Example 4, but employing the starting materials shown below.

| Antimony Trioxide | 1.749 kg |
| Electrolytic Iron Powder | 0.335 kg |
| Ammonium Paramolybdate | 53.0 g |
| Ammomium Paratungstate | 31.3 g |
| Telluric Acid | 206.6 g |
| Copper Nitrate | 145.0 g |
| Nickel Nitrate | 523.5 g |
| Silica Sol (30% by weight of $SiO_2$) | 3.60 kg |

The copper nitrate and nickel nitrate were used by dissolving in a solution of the iron in nitric acid. The final calcining condition for the catalyst was 760° C. for 4 hours.

According to the Test Condition IV described above, this catalyst was in a reaction with a reaction temperature of 430° C., a contact time of 400 seconds and a reaction pressure of 0.5 kg/cm$^2$G. At the start of the reaction, the percent conversion of propylene was 98.0% and the yield of acrylonitrile was 79.5%, and they were not changed for 720 hours of reaction. However, due to the breakdown of the air compressor, the molar ratio of gas to propylene in the supplied gas mixture was dropped and the oxygen concentration in the gas mixture at the outlet of the reactor became zero. The reaction was stopped to repair the air compressor and started again, but the present conversion of propylene and the yield of acrylonitrile were reduced to 96.5% and 76.8%, respectively.

Then, the catalyst was withdrawn from the reactor and treated to regenerate it by the process in accordance with the present invention. More particularly, a 10% aqueous hydrogen peroxide solution in an amount corresponding to the pore volume of the catalyst (which was 0.32 ml/g) was mixed with this deteriorated catalyst to allow the solution to diffuse thoroughly throughout the pores, and the catalyst was dried at 120° C. for 3 hours and then calcined at 700° C. for 2 hours.

When this regenerated catalyst was used in a reaction under the initial reaction conditions, the percent conversion of propylene was 98.2% and the yield of acrylonitrile was 80.0%.

EXAMPLE 8

A catalyst having the empirical formula of $Fe_{10}Sb_{25}Mg_2W_{0.25}Te_{1.0}O_{69.8}(SiO_2)_{30}$ was prepared by procedures similar to those of Example 1, except that the starting material for Mg component was magnesium nitrate, 10.3 g of which were added to a solution of iron nitrate.

When the activity of this catalyst was tested at a reaction temperature of 370° C. according to Test Condition I described above, the percent conversion of butene-1 was 94% and the yield of butadiene was 85%. After the reaction was carried out for 20 hours, the percent conversion of butene-1 and the yield of butadiene dropped to 89% and 78%, respectively.

This catalyst was withdrawn from the reactor, and treated to regenerate it by the process in accordance with the present invention. More particularly, this deteriorated catalyst was allowed to stand at room temperature and then sprayed with a 10% aqueous hydrogen peroxide solution. The spraying was continued until the aqueous hydrogen peroxide solution uniformly spread over all the catalyst particles after which the catalyst was dried at 120° C. for 16 hours, and finally calcined at 500° C. for 2 hours.

The regenerated catalyst was used in a reaction under the same test condition as above to obtain a percent conversion of butene-1 of 92% and a yield of butadiene of 84%.

EXAMPLE 9

A catalyst having the empirical formula of $U_{10}Fe_2Sb_{40}Ti_1O_{111.7}(SiO_2)_{50}$ was prepared by procedures similar to those of Example 2, except that 3.2 g of titanium dioxide was used as the starting material for the Ti component.

The activity of this catalyst was tested in a reaction at a reaction temperature of 430° C. for 7 hours according to Test Condition II described above. At the start of the reaction, the percent conversion of isobutene was 95% and the yield of methacrylonitrile was 59%, but during the reaction the percent conversion of isobutene and the yield of methacrylonitrile both reduced, finally becoming 88% and 50%, respectively.

This catalyst was then withdrawn from the reactor and treated to regenerate it by the process according to the present invention. More particularly, the deteriorated catalyst was sprayed with a 35% aqueous hydrogen peroxide solution. After confirming that all the catalyst particles had been sufficiently wet with the aqueous hydrogen peroxide solution, the catalyst was dried at 120° C. for 16 hours and then calcined at 600° C. for 4 hours.

The regenerated catalyst was used in a reaction using the same test condition as above to obtain a percent conversion of isobutene of 96% and a yield of methacrylonitrile of 61%.

EXAMPLE 10

A fluidized catalyst having the empirical formula of $Sn_{10}Sb_{60}V_{0.5}O_{141.3}(SiO_2)_{100}$ was prepared by procedures similar to those of Example 3, except that as the starting material for the V component was ammonium metavanadate, 15.6 g of which were dissolved in silica sol.

The activity of this catalyst was tested at a reaction temperature of 460° C. and a contact time of 6 seconds according to Test Condition IV described above. At the start of the reaction, the percent conversion of propylene was 97% and the yield of acrylonitrile was 64%. During the reaction, the amount of air supplied was gradually reduced, which caused reductions in both percent conversion of propylene and yield of acrylonitrile. Finally they became 90% and 59%, respectively.

Then, the reaction was stopped, the catalyst was withdrawn from the reactor and treated to regenerate it by the process in accordance with the present invention. More particularly, a 6% aqueous hydrogen peroxide solution in an amount corresponding to the pore volume of the catalyst (0.47 ml/g) was thoroughly mixed together with the catalyst, which was then dried at 120° C. for 16 hours and then calcined at 600° C. for 3 hours.

The regenerated catalyst was used in a reaction under the same test condition as above to obtain a percent conversion of propylene of 97% and a yield of acrylonitrile of 65%.

EXAMPLE 11

A catalyst having the empirical formula of $Fe_{10}Sb_{25}Zn_1O_{66}(SiO_2)_{30}$ was prepared by procedures similar to those of Example 6, except that as the starting material for the Zn component was zinc nitrate, 9.0 g of which was added to a slurry prior to the pH adjustment. Further, the final calcining conditions of the catalyst were 900° C. for 3 hours.

The activity of this catalyst was tested at a reaction temperature of 410° C. according to Test Condition III described above. At the start of the reaction, the percent conversion of propylene was 98% and the yield of acrylonitrile was 68%. After the reaction was carried out for 6 hours, the percent conversion of propylene and the yield of acrylonitrile became 85% and 52%, respectively.

Then, the reaction was stopped, the catalyst was withdrawn from the reactor and treated to regenerate it by the process in accordance with the present invention. More particularly, the catalyst was sprayed with a 6% aqueous hydrogen peroxide solution to allow the aqueous hydrogen peroxide solution to thoroughly diffuse throughout the pores of catalyst, which was, in turn, dried at 120° C. for 16 hours, and then calcined at 400° C. and then at 900° C. for 2 hours, respectively.

The regenerated catalyst was used in a reaction under the same test condition as above to obtain a percent conversion of propylene of 96% and a yield of acrylonitrile of 67%.

EXAMPLE 12

A catalyst having the empirical formula of $Fe_{10}Sb_{25}P_{0.2}Bi_{0.5}O_{65.6}(SiO_2)_{30}$ was prepared by procedures similar to those of Example 6, except that the starting materials for P and Bi components were 0.7 g of a 85% phosphoric acid and 7.3 g of bismuth nitrate and they were added to and dissolved in the slurry prior to the pH adjustment. Further, the final calcining conditions of the catalyst were 900° C. for 2 hours.

The activity of this catalyst was tested in a reaction using a reaction temperature of 420° C. according to Test Condition III described above. At the start of the reaction, the percent conversion of propylene was 100% and the yield of acrylonitrile was 70%, but they both reduced and became 90% and 59%, respectively after 6 hours of reaction.

Then, the reaction was stopped, the catalyst was withdrawn from the reactor and treated to regenerate it by the process in accordance with the present invention. More particularly, the deteriorated catalyst was immersed in a 6% aqueous hydrogen peroxide solution to evacuate and excess aqueous hydrogen peroxide solution was removed. Thereafter, the catalyst was dried at 120° C. for 16 hours, and then calcined at 200° C. for 2 hours and then at 850° C. for 2 hours.

The activity of this regenerated catalyst was tested at a reaction temperature of 420° C. according to Test Condition III described above, and as a result, the percent conversion of propylene showed a recovery to 98% and the yield of acrylonitrile to 68%.

While the invention has been described in detail and with reference to specific embodiments thereof, it will be apparent to one skilled in the art that various changes and modifications can be made therein without departing from the spirit and scope thereof.

What is claimed is:

1. A process for regenerating a deteriorated antimony containing metal oxide catalyst used in oxidative reactions with olefins having the following empirical formula:

$$Me_aSb_bX_cR_dQ_eO_f$$

wherein Me is at least one element selected from the group consisting of Fe, Co, Ni, Mn, U, Ce, Sn and Cu; X is at least one element selected from the group consisting of V, Mo, W, Nb and Ta; R is at least one element selected from the group consisting of B, P, Bi and Te; Q is at least one element selected from the group consisting of Mg, Ca, Sr, Ba, La, Ti, Zr, Cr, Re, Ru, Os, Rh, Ir, Pd, Pt, Ag, Zn, Cd, Al, Ga, In, Tl, Si, Ge, Pb, As, S and Se; the subscripts a, b, c, d, e and f represent atomic ratios, and where a is 10, b is 5 to 60, c is 0 to 30, d is 0 to 10, e is 0 to 20, and f is the number of oxygen atoms that combine with these components to form an oxide which comprises impregnating or spraying said antimony containing metal oxide catalyst with 0.05 to 60 wt % based on said catalyst of an aqueous hydrogen peroxide solution, having a concentration of about 0.5 to 35 wt %, drying thus impregnated catalyst, and calcining the catalyst from 400° to 1,000° C.

2. The process of claim 1, wherein said aqueous hydrogen peroxide solution additionally contains at least one element selected from the group consisting of vanadium, molybdenum, tungsten and tellurium.

3. The process of claim 1, wherein said aqueous hydrogen peroxide solution additionally contains at least one member selected from the group consisting of vanadic acid, molybdic acid, tungstic acid and salts thereof.

4. The process of claim 1, wherein said aqueous hydrogen peroxide solution additionally contains a compound prepared by oxidizing metallic tellurium, tetravalent telluride or tellurium oxide hydrate with hydrogen peroxide.

5. The process of claim 1, wherein said calcination temperature is lower than a temperature 20° C. higher than the final or highest calcination temperature used in manufacturing the catalyst.

6. The process of claim 1 wherein said catalyst is calcined at a temperature in the range of 500° to 1000° C.

7. The process of claim 1 wherein said catalyst is calcined at a temperature of about 500° C.

8. The process of claim 1 wherein said catalyst is calcined at a temperature of about 600° C.

9. The process of claim 1 wherein said catalyst is calcined at a temperature of about 700° C.

10. The process of claim 1 wherein said catalyst is calcined at a temperature of about 800° C.

* * * * *